United States Patent [19]

Aizawa

[11] Patent Number: 4,664,383
[45] Date of Patent: May 12, 1987

[54] IRON-TYPE GOLF CLUB HEAD
[75] Inventor: Yuichi Aizawa, Tokyo, Japan
[73] Assignee: Daiwa Golf Co., Ltd., Tokyo, Japan
[21] Appl. No.: 791,206
[22] Filed: Oct. 25, 1985
[30] Foreign Application Priority Data Nov. 5, 1984 [JP] Japan ............................ 59-169765[U]
Nov. 5, 1984 [JP] Japan ............................ 59-167704[U]

[51] Int. Cl.⁴ ...................... A63B 53/04; A63B 53/02
[52] U.S. Cl. ............................. 273/78; 273/DIG. 7; 273/80.3
[58] Field of Search .................. 273/78, 169, DIG. 7, 273/170, 171, 172, 173, 174, 175, 167 F, 167 J, 168, 80.3

[56] References Cited
U.S. PATENT DOCUMENTS 1,602,567 10/1926 Colwell .................................. 273/78
1,867,103 7/1932 Schavoir .............................. 273/78
1,968,626 7/1934 Young .................................. 273/78

FOREIGN PATENT DOCUMENTS 692197 8/1964 Canada .............................. 273/169
0159769 9/1983 Japan .................................. 273/78
16670 2/1984 Japan .................................. 273/78
2132902 7/1984 United Kingdom ................ 273/78

Primary Examiner—George J. Marlo
Attorney, Agent, or Firm—Kalish & Gilster

[57] ABSTRACT

A metal golf club head having a core with a face or ball-addressing surface; the core being connected to a hosel. At least the core face is covered by a first layer of non-oriented short fiber reinforced synthetic resin, and a second layer of reinforced synthetic resin material disposed on said first layer. The first and second layers, being resilient, impart energy to the ball after striking. A reinforced fiber tape may be disposed about the zone joining the core and the hosel, as well as the hosel, for increasing the mechanical strength of such connecting portion; said first and second synthetic layers being disposed over said reinforced fiber tape.

10 Claims, 6 Drawing Figures

IRON-TYPE GOLF CLUB HEAD

BACKGROUND OF THE INVENTION

1. Field of the Invention

The present invention relates to a metal golf club head, more particularly, to a metal golf club head which ensures softness when hitting a ball and good control thereof, and has improved characteristics for accumulating impact resilient energy.

2. Description of the Prior Art

Generally, a metal golf club head is integrally formed from a metal such as a brass, stainless steel or the like. The club head of this type is designed to have a shape and a weight corresponding to the number given to the club. Such a club head is, however, a mass of metal and therefore tends to lack elasticity. In particular, the ball hitting surface of the iron head, which is the part most essential for hitting a ball, has a low elasticity which means there is a small coefficient of restitution of the surface, and this prevents the metal club head from exhibiting the softness on hitting a ball which is available with wood clubs as well as a long ball-hitting distance.

To obviate this problem, a metal golf club head has heretofore been known in which a synthetic resin layer reinforced by the incorporation of a carbon fiber or a glass fiber is formed on the surface of a head body, including the ball hitting surface, so as to increase the impact resilient force of the ball hitting surface. Such a metal golf club was disclosed in, for example, the specification of Japanese Utility Model Laid-Open No. 16670/1984.

According to this known golf club head, in order to attach and retain on the head body the reinforced synthetic resin layer formed on the head, the head is provided with a multiplicity of bores penetrating its metallic core material from the face side to the back side, and the reinforced synthetic resin layers formed on the face side and back side of the metallic core material are coupled together by means of the same synthetic resin material as is used on the face and back sides being charged into the above described bores.

Thus, due to the multiplicity of through bores formed in the metallic core material, the metal golf club head of this type suffers a problem in that the impact stress occurrring in the reinforced synthetic resin layer as a result of the impact when the ball is hit by the ball hitting surface of the head body is propagated through the coupling synthetic resin material in the through bores and absorbed by the reinforced synthetic resin layer on the back side. In other words, the impact resilient energy caused by the impact is attenuated, leaving no impact resilient energy stored in the face surface, which results in a decrease in the resilient force applied to a ball and, therefore, in the incapability of extending the distance over which a ball can be hit.

In the metal golf club head of the type disclosed in the specification of the above described Japanese Utility Model Laid-Open No. 16670/1984, an attempt has also been made to increase the ball hitting distance at the same time as exhibiting softness at the time of hitting a ball by employing a lighter club head in which the thickness of each part of the metallic head, including its face portion, is made thinner, and, in accordance with this improvement, by providing the head body with a synthetic resin layer which includes a reinforcing fiber.

As a result, as the portion of the head body which is made of metal becomes thinner and lighter in weight, this type of iron head involves another disadvantage in that the mechanical strength at the portion which joins the face portion and the hosel portion of the head body decreases, causing the jointing portion to become deformed, cracked or broken by the impact which occurs when the ball is hit.

SUMMARY OF THE INVENTION

In view of the above described problems accompanying the conventional metal golf club head, a primary object of the present invention is to provide a metal golf club head in which the impact resilient force created in the head face surface is so increased as to extend the ball hitting distance, as well as ensuring the retention of reinforced synthetic resin layer to the head body.

Another object of the present invention aims at the provision of a metal golf club head in which it is possible to increase the mechanical strength of the jointing portion of the face side of the head body and the hosel portion thereof, and to prevent the occurrence of deformation, breakage or crack of the jointing portion.

DESCRIPTION OF THE PREFERRED EMBODIMENTS

Embodiments of the present invention will be described hereinunder with reference to the accompanying drawings.

Figure 1:
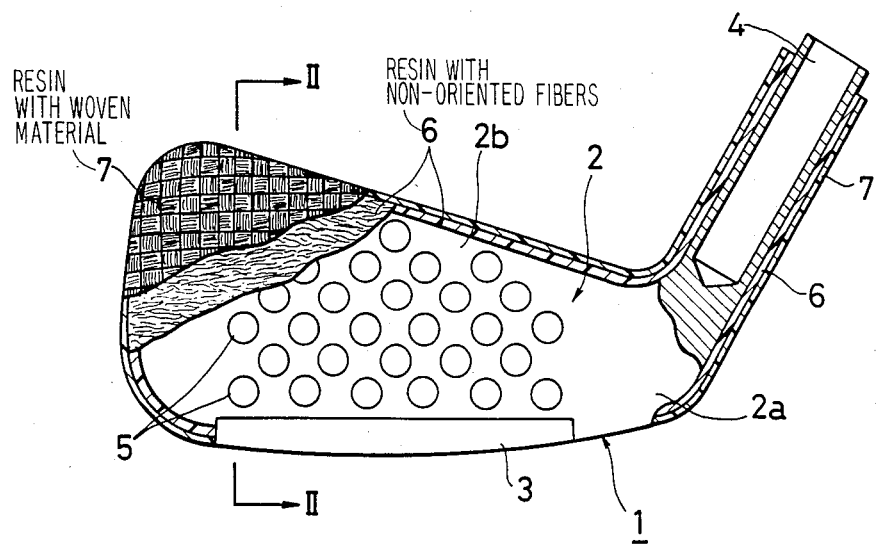
FIG. 1 is a partially cut away front view of one embodiment of a metal golf club head according to the present invention.
Figure 2:
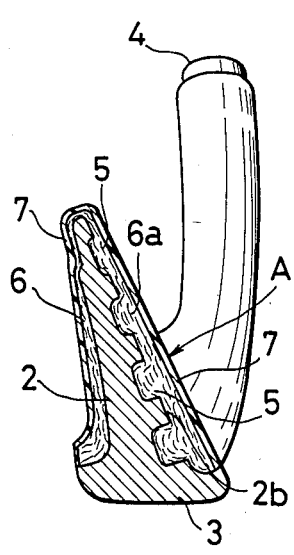
FIG. 2 is a sectional view taken along the line II—II of FIG. 1.

FIGS. 1 and 2 show one example of a metal golf club head according to the present invention. In the Figures, the reference numeral 1 designates a head body integrally formed from a metallic material such as a stainless steel, brass, or the like. The head body 1 has a core portion 2, the face side of which is inclined at a desired angle backwardly, a sole portion 3 integrally formed with this core portion 2 at the center of its lower edge, and a hosel 4 integrally formed with the core portion 2 on its heel portion 2a and inclined relative to the sole portion 3. The core portion 2 is provided on its face surface 2b with a multiplicity of circular recess portions 5.

The thus arranged head body 1 has a non-oriented short fiber reinforced synthetic resin layer 6 incorporating a short reinforcing fiber such as a carbon fiber, glass fiber or the like in a predetermined ratio provided over the whole of its metallic surface, i.e., on the outer surfaces of the core portion 2 and hosel 4 of the head body 1 except for the lower surface of the sole portion 3. The layer 6 is formed with a desired thickness which varies from place to place over the surface of the head. The outer surface of this non-oriented short fiber reinforced synthetic resin layer 6 is then covered to a predetermined thickness with a textile-reinforced synthetic resin layer 7 made from a woven material of a carbon or glass fiber impregnated with a synthetic resin material.

It should be noted that the length of the above reinforcing short fiber incorporated in the synthetic resin layer 6 is between 10 mm to 30 mm, and that a vinyl ester, epoxy, polycarbonate or the like is used as the above described synthetic resin material incorporated in the synthetic resin layer 7. Each of the above synthetic resin layers is formed by means of a head forming mold.

In a metal golf club head arranged in the above described manner, the non-oriented short fiber-reinforced synthetic resin layer 6a on the head face portion A which comprises the ball hitting surface is abutted on the face surface 2b and the recess portions 5 of the core portion 2. Since this abutting area of the layer 6a is enlarged by virtue of the recess portions 5, the bonding strength of the non-oriented short fiber-reinforced synthetic resin layer 6a is increased, thus preventing the non-oriented short fiber-reinforced synthetic resin layer 6a from peeling off the face surface 2b. Further, the entire non-oriented short fiber reinforced synthetic resin layer 6a is covered with the textile-reinforced synthetic resin layer 7, and apart from the sole portion 3, the entire head body 1 is covered with the textile-reinforced synthetic resin layer 7 which is integrally formed thereon. This arrangement further ensures the retention of the non-oriented short fiber-reinforced synthetic resin layer 6.

Moreover, the head face portion A of this golf club head is composed of the non-oriented short fiber reinforced synthetic resin layer 6a and the textile-reinforced synthetic resin layer 7, while the core portion 2 which opposes the head face portion A has no through bores formed therein. Consequently, the impact at the time when a ball is hit is not dispersed by being propagated to the back side. At the same time, the non-oriented short fiber-reinforced synthetic resin layer 6a formed in the ball hitting surface is partially compressed between the textile-reinforced synthetic resin layer 7 and the core portion 2. In other words, the layer 6a partially accumulates the impact stress on hitting a ball which turns into a resilient energy. Furthermore, the outer textile-reinforced synthetic resin layer 7, like the gut of a tennis racket, produces a tensioned stress not only at its ball hitting portion but all over the surface of the head face portion A. The impact resilient force caused by this tensioned stress, together with the impact resilient energy stored in the non-oriented short fiber-reinforced synthetic resin layer 6a acts on the ball just after the moment when the ball is hit. Namely, the impact energy created by the ball being hit is multiplied by the combination of these two layers and the core portion, is stored within the head face portion A, and is given to the ball just when the ball parts from the ball hitting surface. Thus it is possible to extend the ball hitting distance and, at the same time, to give the golfer an impression of softness when hitting a ball, and to make ball control easier.

The employment of the coating of the textile-reinforced synthetic resin layer 7 also makes it possible for a golf club head to have a greater variety of color designs thereby improving the design possibilities for a golf club head.

Figure 3:
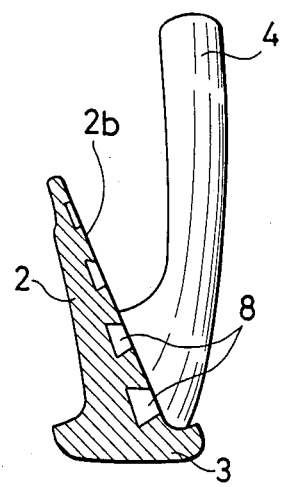
FIG. 3 is a sectional view of a head body, showing another embodiment of the present invention.

In the above described embodiment, the face surface 2b of the core portion 2 has circular recess portions 5. These recess portions 5, however, may have a square, triangular, honeycomb-like, or other shape. Also, the face surface 2b may be provided with dove-tail grooves 8, as shown in FIG. 3, in place of the recess portions 5. Further, the above described embodiment employs a system in which the entire surface of the head body 1, except for the sole portion 3, is covered with the non-oriented short fiber-reinforced synthetic resin layer 6 and the textile reinforced synthetic resin layer 7. The iron head may alternatively be arranged in other ways in which only the head face portion A is coated with these two layers 6 and 7.

As described above, according to the present invention, the face surface of the head body is made uneven, and two layers of the inner non-oriented short fiber-reinforced synthetic resin layer and the outer textile-reinforced synthetic resin layer are provided at least on the face surface of the head body. Therefore, it is possible for each of these layers to be retained firmly on the head body. At the same time, the impact resilient force generated in the face portion and given to the ball can be increased, resulting in an extension of the ball hitting distance.

Figure 4:
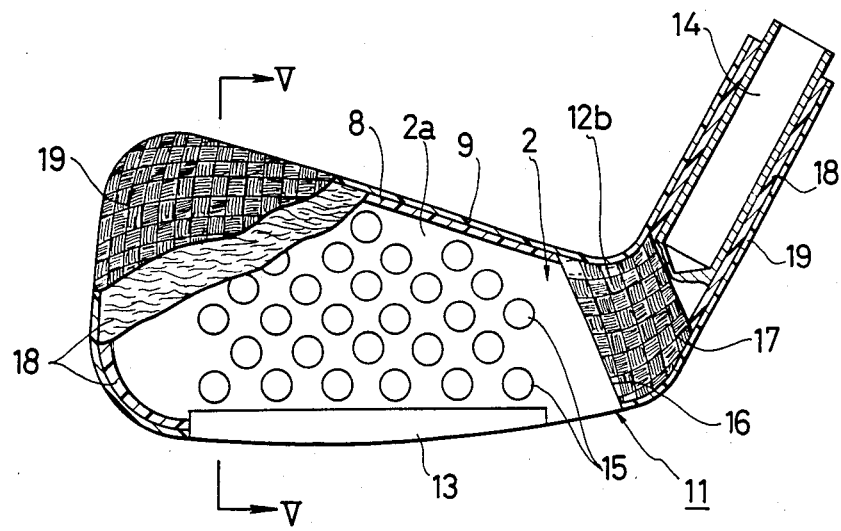
FIG. 4 is a partially cut away front view of still another embodiment of a metal golf club head according to the present invention.
Figure 5:
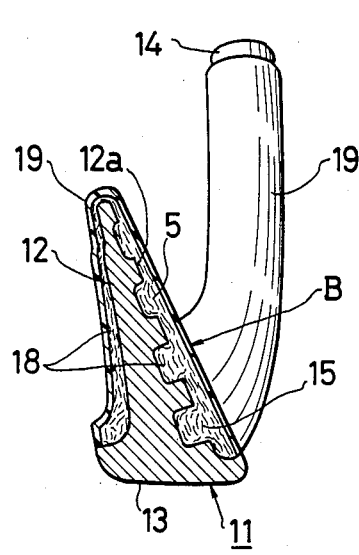
FIG. 5 is a sectional view taken along the line V—V of FIG. 4.
Figure 6:
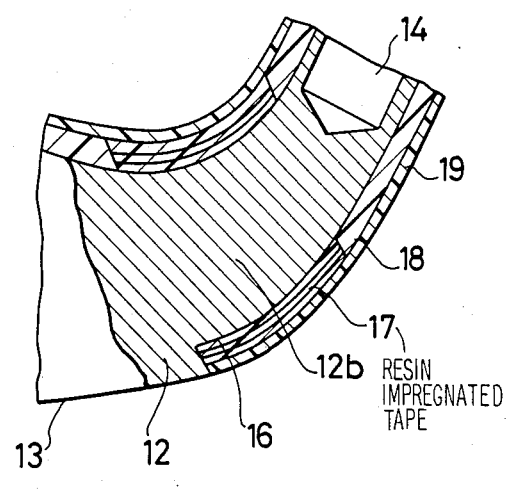
FIG. 6 is an enlarged sectional view showing the reinforcing portion of FIG. 4.

FIGS. 4 to 6 show still another embodiment of a metal golf club head according to the present invention. Referring to the Figures, the reference numeral 11 designates a head body integrally formed from a metal material such as stainless steel, brass or the like. The head body 11 has a core portion 12, the face side of which is inclined at a desired angle backwardly, a sole portion 13 integrally formed with this core portion 12 in the center of the lower edge of the core portion 12, and a hosel portion 14 integrally formed with the core portion 12 at its rear edge side and inclined relative to the sole portion 13. The face surface 12a of the core portion 12 is provided with a multiplicity of recess portions 15, and the portion 12b which connects the core portion 12 and the hosel 14 is provided at its lower portion with a notch 16.

In the thus arranged head body 11, the connecting portion 12b which joins the core portion 12 and the hosel 14 has a tape-like reinforced fiber tape 17 wound around it a plurality of times (about 3 to 5 times) so as to increase the mechanical strength of the connecting portion 12b, this fiber tape 17 being composed of a woven material of a carbon fiber, glass fiber or the like impregnated with a synthetic resin material. At this time, since the connecting portion 12b is curved, the reinforced fiber tape 17 may be wound on its portion obliquely so as to prevent the fiber tape 17 from slipping off.

The thus arranged head body 11, after having the reinforced fiber tape 17 wound around it, is provided with a synthetic resin layer 18 reinforced by including a reinforcing short fiber such as a carbon fiber, glass fiber or the like at a predetermined ratio on the entire head body 11, i.e., the entire surface of the head body including the core portion 12, the reinforced fiber tape wound portion and the hosel 14 except for the lower surface of the sole portion 13. The layer 18 is formed with a desired thickness which varies from place to place over the surface of the head. The outer surface of this fiber reinforced synthetic resin layer 18 is then coated into a predetermined thickness with textile-reinforced synthetic resin layer 19 which is composed of a woven material of a carbon fiber, glass fiber or the like impregnated with a synthetic resin material.

It is to be noted that vinyl ester, epoxy, polycarbonate and so on may be utilized as the above synthetic resin material, and that each of the above synthetic resin layers is formed using a head forming mold.

In a metal golf club head constructed in the above described manner, the fiber-reinforced synthetic resin layer 18 and the textile-reinforced synthetic resin layer 19 formed on the face portion B which comprises the ball hitting surface stores the impact energy produced when hitting a ball. This energy is then given to a ball at the moment the ball parts from the ball hitting surface, by which it is possible to extend the ball hitting distance, and at the same time, to give a golfer an impression of softness in hitting the ball, and to make ball control easier.

Further, the use of the reinforced fiber tape 17 on the connecting portion 12b increases the mechanical strength thereof, thereby preventing the connecting portion 12b from being deformed, broken or cracked.

The reinforced fiber tape 17 may be wound not only around the connecting portion 12b but also around the entire hosel, including the connecting portion 12b. Also, the reinforced fiber tape 17 which is made of a synthetic resin reinforced by a fiber in the form of a woven material may also be a synthetic resin reinforced by oriented long fibers or non-oriented short fibers having a length of 10 to 30 mm. The above embodiment employs the reinforced fiber tape in the form of a tape. The connecting portion may alternatively have a bundle of oriented fibers wound around it in place of this fiber tape and then be coated with a synthetic resin.

As described above, the portion of club head according to the present invention which connects the face portion and the hosel portion is weakened as a consequence of the use of a thinner and lighter carbon steel for the metallic head body but is reinforced by the reinforced fiber tape being wound around the outer periphery of the connecting portion a plurality of times. Consequently, even if the connecting portion is made thinner and the diameter thereof is made smaller, the mechanical strength thereof is adequate for withstanding any bending, twisting or the like, thus preventing the connecting portion from being deformed, broken or cracked and at the same time assuring a thinner and lighter head body.

What is claimed is:

1. An iron-type golf club head comprising a head body integrally formed from a metallic material, the head body including a core portion having a face side backwardly inclined at a selected angle, a sole portion integrally formed with the sole portion, and a hosel integrally formed with the core portion at a heel portion thereof, the hosel being inclined relative to the sole portion, the core portion being provided on the face side with a plurality of recess portions, and further characterized by an inner layer of synthetic resin with non-oriented reinforcing fibers lying therein which overlies the face side of the core portion, said inner layer varying in thickness across the face side, and an outer layer entirely overlying the inner layer in covering relationship, the outer layer being of textile-reinforced synthetic resin and providing over the face side a ball hitting surface, whereby said inner layer accumulates impact stress upon the head hitting a ball to provide stored resilient energy, and the outer layer produces a tensioned stress across the ball hitting surface causing impact resilient force which, together with the stored resilient energy, acts on the ball just after the ball is hit.

2. An iron-type golf club head as defined in claim 1 wherein the recess portions are circular.

3. An iron-type golf club head as defined in claim 1 wherein the recess portions are dove-tail grooves.

4. An iron-type golf club head as defined in claim 1 wherein said inner and outer layers both extend across a top surface of the core portion for thereby covering also a back side, the inner and outer layers thereby being disposed about the core portion except for the sole portion.

5. An iron-type golf club head as defined in claim 4 wherein said inner layer is constituted by two layers of synthetic resin with reinforcing fibers therein.

6. An iron-type golf club head as defined in claim 4 wherein the hosel has a resin impregnated tape of woven material wound about it a plurality of times, said inner layer overlying the resin impregnated tape.

7. An iron-type golf club head as defined in claim 6 wherein the hosel is provided at a lower portion thereof with a notch, the resin impregnated tape being wound about the hosel within the notch.

8. An iron-type golf club head as defined in claim 4 wherein the outer layer is constituted of woven fibers from the class consisting of carbon and glass fibers, the woven fibers being impregnated with a synthetic resin from the class consisting of vinyl esters, epoxys, and polycarbonates.

9. An iron-type golf club head as defined in claim 4 wherein the outer layer comprises woven fibers from the class consisting of carbon fibers and glass fibers and with said woven fibers being impregnated with a synthetic resin from the class consisting of vinyl esters, epoxys and polycarbonates.

10. An iron-type golf club head as defined in claim 4 wherein the reinforcing fibers have a length of between 10 mm to 30 mm.

* * * * *